(12) United States Patent
Han et al.

(10) Patent No.: US 8,228,985 B2
(45) Date of Patent: Jul. 24, 2012

(54) METHOD AND APPARATUS FOR ENCODING AND DECODING BASED ON INTRA PREDICTION

(75) Inventors: Woo-jin Han, Suwon-si (KR); Jae-chool Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1292 days.

(21) Appl. No.: 11/936,180

(22) Filed: Nov. 7, 2007

(65) Prior Publication Data

US 2008/0107177 A1    May 8, 2008

Related U.S. Application Data

(60) Provisional application No. 60/857,113, filed on Nov. 7, 2006.

(30) Foreign Application Priority Data

Jan. 18, 2007  (KR) .................. 10-2007-0005807

(51) Int. Cl.
  *H04N 7/12* (2006.01)
  *H04N 11/02* (2006.01)
  *H04N 11/04* (2006.01)

(52) U.S. Cl. ............... 375/240.12; 375/240.13

(58) Field of Classification Search .............. None
See application file for complete search history.

(56) References Cited

U.S. PATENT DOCUMENTS

| | | | |
|---|---|---|---|
| 5,815,209 A | 9/1998 | Kondo et al. | |
| 2006/0120456 A1* | 6/2006 | Tasaka et al. | 375/240.16 |
| 2006/0222080 A1* | 10/2006 | Wang | 375/240.24 |
| 2007/0047648 A1* | 3/2007 | Tourapis et al. | 375/240.13 |

FOREIGN PATENT DOCUMENTS

| | | |
|---|---|---|
| JP | 2000287216 A | 10/2000 |
| WO | 2005088979 A1 | 9/2005 |

* cited by examiner

*Primary Examiner* — Chirag Shah
*Assistant Examiner* — Minh-Trang Nguyen
(74) *Attorney, Agent, or Firm* — Sughrue Mion, PLLC (57) ABSTRACT

A method and apparatus for encoding and decoding an image based on intra prediction are provided. The method comprises predicting an intra prediction direction of a current block based on an intra prediction direction of a reference block located at an Nth pixel in the x-axis and an Mth pixel in the y-axis with respect to the current block, and intra prediction encoding the current block based on the actual intra prediction direction of the current block and the predicted intra prediction direction of the current block. Accordingly, the compression rate of image data can be improved by accurately predicting the intra prediction direction.

15 Claims, 9 Drawing Sheets

FIG. 1 (RELATED ART)

0 (VERTICAL)

1 (HORIZONTAL)

2 (DC)

3 (PLANE)

|  | CODE | NUMBER OF BITS |
|---|---|---|
| P = min(A,L) | 1 | 1 |
| P! = min(A,L) | 0 XXX | 4 |

METHOD AND APPARATUS FOR ENCODING AND DECODING BASED ON INTRA PREDICTION

CROSS-REFERENCE TO RELATED PATENT APPLICATION

This application claims priority from Korean Patent Application No. 10-2007-0005807, filed on Jan. 18, 2007, in the Korean Intellectual Property Office, and U.S. Provisional Application No. 60/857,113, filed on Nov. 7, 2006, in the U.S. Patent and Trademark Office, the disclosures of which are incorporated herein in their entirety by reference.

BACKGROUND OF THE INVENTION

1. Field of the Invention

Methods and apparatuses consistent with the present invention relate to a method and apparatus for encoding and decoding based on intra prediction, and more particularly, to a method and apparatus which can increase a compression rate of image data encoding by accurately predicting an intra prediction direction of a current block that is to be encoded.

2. Description of the Related Art

In related art methods of image compression, such as MPEG-1, MPEG-2, and MPEG-4 H.264/MPEG-4 advanced video coding (AVC), a picture is divided into macro blocks in order to encode an image. Then, each macro block is encoded using inter prediction and intra prediction. The macro blocks are then encoded after selecting a suitable encoding mode by considering data size of the encoded macro block and distortion of the original macro block.

In an intra prediction, a macro block of a current picture is encoded using pixel values spatially adjacent to the current block that is to be encoded, not a reference picture. First, a prediction value of the current block that is to be encoded is calculated using the adjacent pixel values. Then, a difference between the prediction value and a pixel value of the original current block is encoded. Here, intra prediction modes can be largely divided into an intra prediction mode in luminance components and an intra prediction mode in chrominance components. The intra prediction mode in luminance components is divided into a 4×4 intra prediction mode, an 8×8 intra prediction mode, and a 16×16 intra prediction mode.

Figure 1:
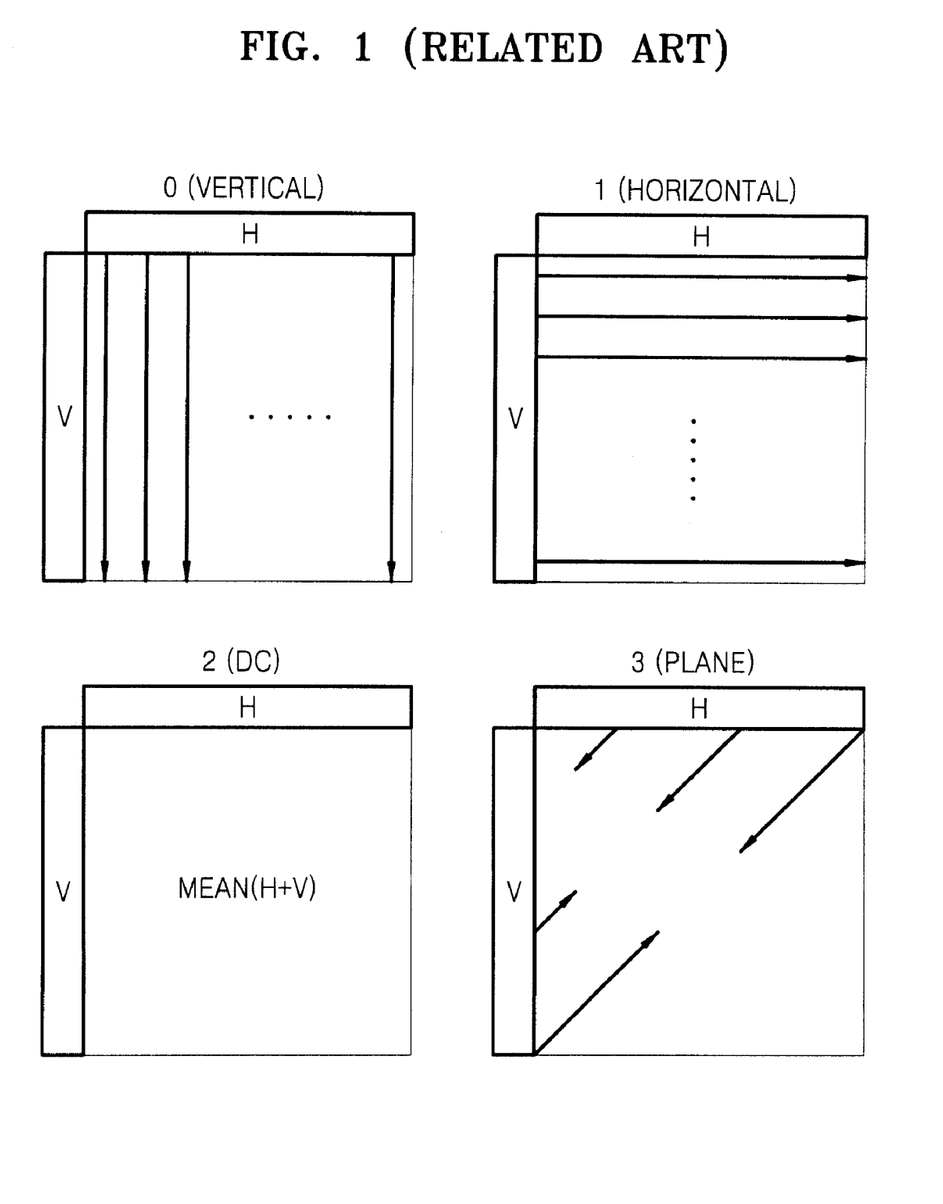
FIG. 1 illustrates a related art 16×16 intra prediction mode.

FIG. 1 illustrates a related art 16×16 intra prediction mode.

Referring to FIG. 1, the 16×16 intra prediction mode includes a total of four modes, i.e., a vertical mode, a horizontal mode, a direct current (DC) mode, and a plane mode.

Figure 2:
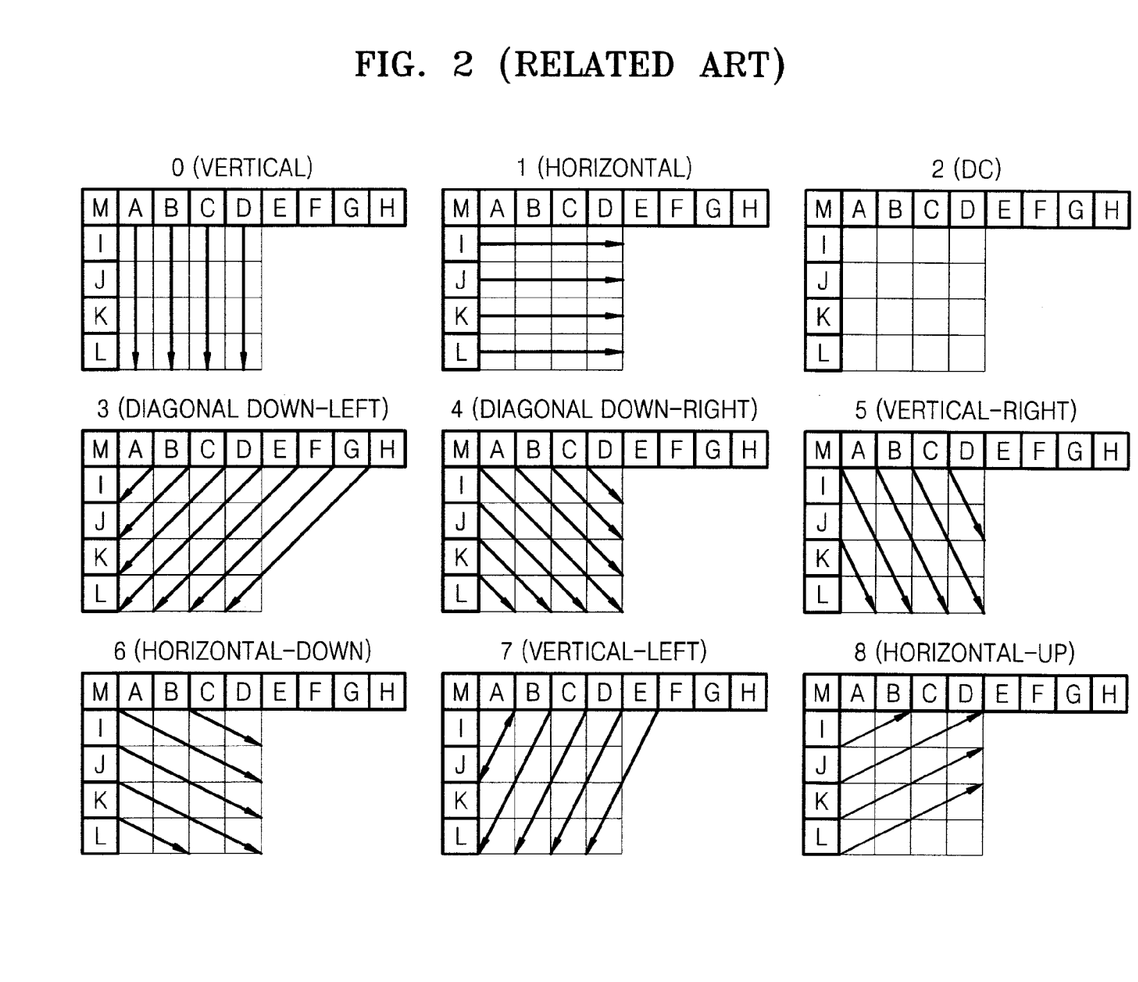
FIG. 2 illustrates a related art 4×4 intra prediction mode.

FIG. 2 illustrates a related art 4×4 intra prediction mode.

Referring to FIG. 2, the 4×4 intra prediction mode includes a total of nine modes, i.e., a vertical mode, a horizontal mode, a DC mode, a diagonal down-left mode, a diagonal down-right mode, a vertical right mode, a vertical left mode, a horizontal-up mode, and a horizontal-down mode.

Prediction mode numbers indexed in each mode are determined based on the frequency with which each mode is used. The vertical mode, i.e., mode 0, is the most frequently used mode while performing intra prediction on a corresponding block, and the horizontal-up mode, i.e., mode 8, is the least used.

Operations of prediction encoding a 4×4 current block using mode 0 of FIG. 2, i.e., the vertical mode, will be described. First, pixel values of pixels A through D, adjacent to the upper part of the 4×4 current block, are predicted as pixel values of the 4×4 current block. That is, the pixel value of pixel A is predicted as four pixel values included in the first column of the 4×4 current block, the pixel value of pixel B is predicted as four pixel values included in the second column of the 4×4 current block, the pixel value of pixel C is predicted as four pixel values included in the third column of the 4×4 current block, and the pixel value of pixel D is predicted as four pixel values included in the fourth column of the 4×4 current block. Next, a difference between the prediction values of the 4×4 current block predicted using pixels A through D and actual values of pixels included in the original 4×4 current block is obtained, and bit-stream of the 4×4 current block is generated by encoding the difference.

In encoding an image according to the H.264 standard, a current macro block is encoded using a total of 13 modes from the 4×4 intra prediction mode and the 16×16 intra prediction mode in order to perform intra prediction encoding using the optimum mode. The optimum mode is selected by considering residue and distortion between the original block and the predicted block.

In order to decode an intra prediction encoded bit stream, a receiver which receives the intra predicted encoded bit stream requires information about an intra prediction direction. Accordingly, the information about the intra prediction direction is inserted into the bit stream and then the bit stream is transmitted to the receiver while intra prediction encoding is performed. When inserting the information about the intra prediction direction into the bit stream, a predetermined encoding method is used in order to reduce the number of bits. Hereinafter, intra prediction encoding according to the H.264 standard will be described.

Figure 3A:
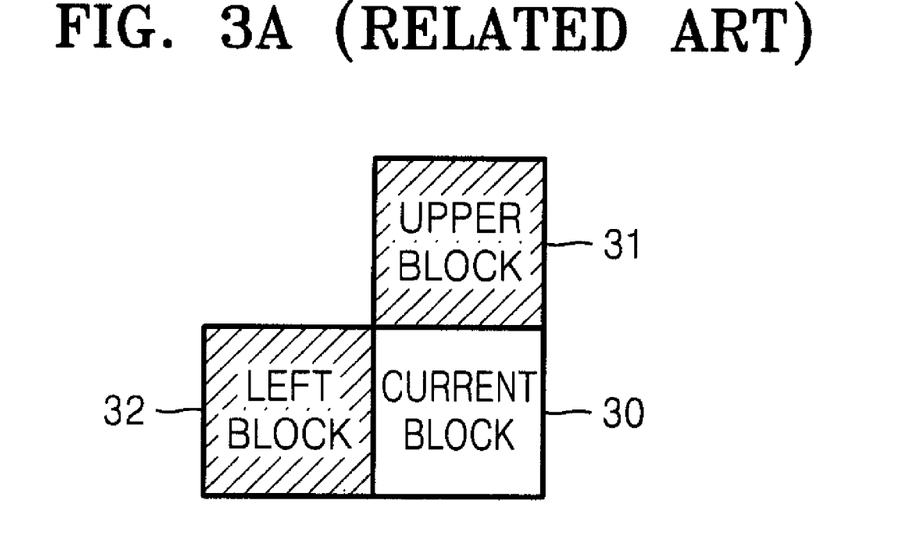
FIGS. 3A and 3B illustrate a related art method of encoding information about an intra prediction direction.
Figure 3B:
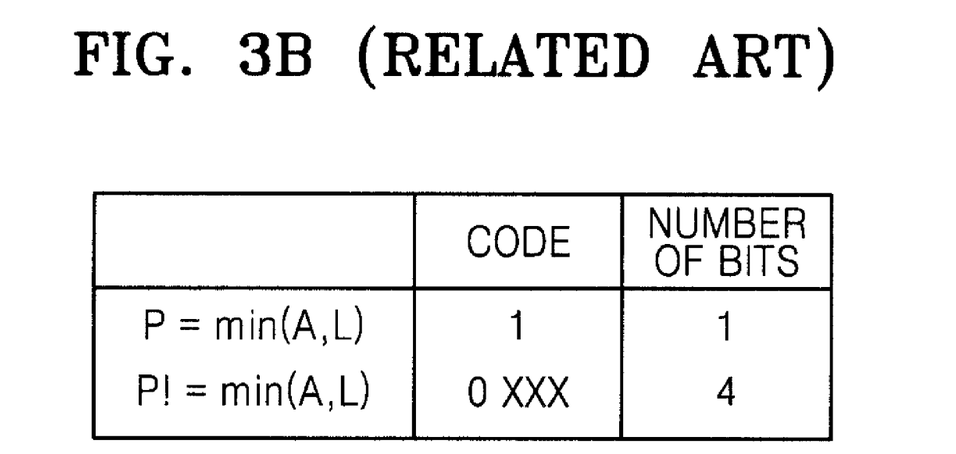

FIGS. 3A and 3B illustrate a related art method of encoding information about an intra prediction direction. P denotes an intra prediction mode number of a current block 30, A denotes an intra prediction mode number of an upper block 31, and L denotes an intra prediction mode number of a left block 32.

In the intra prediction encoding according to the H.264 standard, information about the intra prediction direction of the current block 30 is encoded by referring to intra prediction directions of the upper block 31, which is adjacent to the upper side of the current block 30, and the left block 32, which is adjacent to the left side of the current block 30. The upper block 31 and the left block 32 are adjacent blocks for which encoding was completed before the current block 30, and have prediction mode numbers which respectively indicate an intra prediction direction.

First, an intra prediction mode number of the current block 30 is compared with a minimum intra prediction mode number from among an intra prediction mode number of the upper block 31 and an intra prediction mode number of the left block 32.

When the minimum intra prediction mode number and the intra prediction mode number of the current block 30 are equal, the intra prediction mode number of the current block 30 is encoded to 1 and inserted into a bit stream. A receiver, upon receiving the bit stream, determines the intra prediction mode number of the current block 30 to be the minimum intra prediction mode number by referring to the intra prediction mode numbers of the upper block 31 and the left block 32, and then performs decoding based on the corresponding intra prediction direction. As described above, a prediction mode number is determined based on the frequency with which each mode is used, and since the current block 30 has a high possibility of having a similar intra prediction direction as the adjacent blocks, the minimum intra prediction mode number from the adjacent blocks and the intra prediction mode number of the current block 30 may be equal. Accordingly, the information about the intra prediction direction of the current block 30 can be expressed in one bit, and the information is compressed accordingly.

When the minimum intra prediction mode number and the intra prediction mode number of the current block 30 are not equal, 0 is inserted into the bit stream. The intra prediction mode number of the current block 30 cannot be determined from the adjacent blocks since the minimum intra prediction mode number and the intra prediction mode number of the current block 30 are not equal. Accordingly, information about the intra prediction direction is inserted as 'XXX', i.e., in 3 bits, in the bit stream. There are 9 intra prediction mode numbers, from 0 to 8, and since the above described minimum intra prediction mode number is not the intra prediction mode number of the current block 30, 8 intra prediction mode numbers, excluding the minimum intra prediction mode number, are expressed by 3 bits. In detail, when the minimum intra prediction mode number from the intra prediction mode number of the upper block 31 and the intra prediction mode number of the left block 32 is larger than the intra prediction mode number of the current block 30, binary of the intra prediction mode number of the current block 30 becomes 'XXX'. However, when the minimum intra prediction mode number is smaller, 'XXX' is a binary value obtained by subtracting 1 from the binary value of the intra prediction mode number of the current block 30.

According to a related art technology, when the intra prediction mode number of the current block 30 is equal to the minimum intra prediction mode number of the adjacent blocks, information about the intra prediction direction of the current block 30 can be compressed. However, when the intra prediction mode number of the current block 30 is not equal to the minimum intra prediction mode number, information about the intra prediction direction can be expressed in 4 bits.

Accordingly, when the same direction as the actual intra prediction direction of a current block can be predicted by accurately predicting the intra prediction direction of the current block, the compression rate of image data can be increased.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method and apparatus for encoding and decoding based on intra prediction which can accurately predict an intra prediction direction of a current block, and a computer readable recording medium having recorded thereon a program for executing the method.

According to an aspect of the present invention, there is provided a method of encoding an image based on an intra prediction, the method comprising: determining an intra prediction direction of a reference block located at an Nth pixel in the x-axis and an Mth pixel in the y-axis with respect to a current block; predicting an intra prediction direction of the current block based on the determined intra prediction direction of the reference block; determining the intra prediction direction of the current block; and intra prediction encoding the current block based on the predicted intra prediction direction and the determined intra prediction direction.

The determining of the intra prediction direction of the reference block may include determining the intra prediction direction of the reference block by using pixels included in a pre-encoded area adjacent to the reference block; and predicting an intra prediction direction of the current block based on the determined intra prediction direction of the reference block.

N may be a negative integer whose absolute value is smaller than the width of the current block, and M may be a positive integer whose absolute value is smaller than the length of the current block.

According to another aspect of the present invention, there is provided an apparatus for encoding an image based on an intra prediction, the apparatus including: an intra predictor which predicts an intra prediction direction of a current block based on an intra prediction direction of a reference block located at an Nth pixel in the x-axis and an Mth pixel in the y-axis with respect to the current block, and determining the intra prediction direction of the current block; an encoder which intra prediction encodes the current block based on the predicted intra prediction direction and the determined intra prediction direction.

According to another aspect of the present invention, there is provided a method of decoding an image based on an intra prediction, the method including: receiving a bit stream including data about the current block that is intra prediction encoded based on a predicted intra prediction direction that is predicted based on an intra prediction direction of a reference block located at an Nth pixel in the x-axis and an Mth pixel in the y-axis with respect to the current block, and a determined intra prediction direction; extracting data about the intra prediction direction from the received bit stream; and intra predicting the current block based on the extracted data about the intra prediction direction.

According to another aspect of the present invention, there is provided an apparatus for decoding an image based on intra prediction, the apparatus including: a decoder which receives a bit stream including data about the current block that is intra prediction encoded based on a predicted intra prediction direction that is predicted based on an intra prediction direction of a reference block located at an Nth pixel in the x-axis and an Mth pixel in the y-axis with respect to the current block, and a determined intra prediction direction, and extracts data about the intra prediction direction from the received bit stream; and an intra predictor which intra predicts the current block based on the extracted data about the intra prediction direction.

According to another aspect of the present invention, there is provided a computer readable recording medium having recorded thereon a computer program for executing the methods of encoding and decoding an image based on intra prediction as described above.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described more fully with reference to the accompanying drawings, in which exemplary embodiments of the invention are shown.

Figure 4:
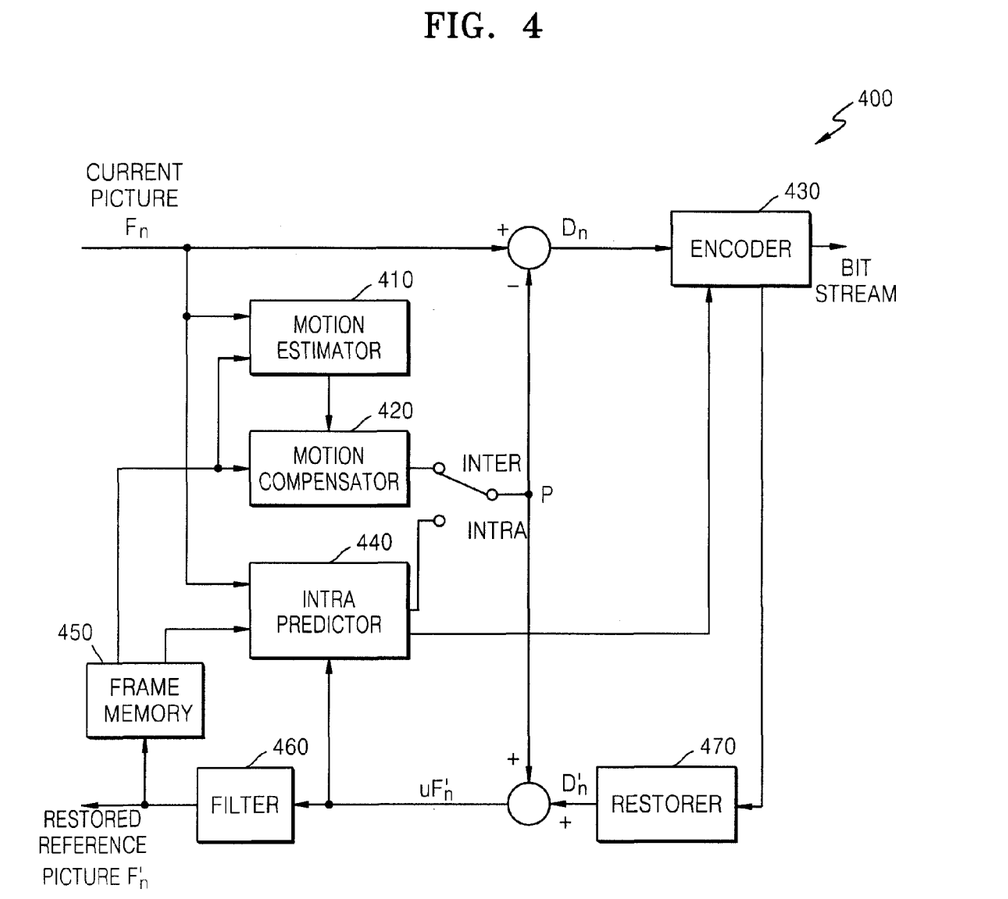
FIG. 4 illustrates an image encoding apparatus employing an apparatus for encoding based on an intra prediction according to an exemplary embodiment of the present invention.

FIG. 4 illustrates an image encoding apparatus 400 employing an apparatus for encoding based on an intra prediction according to an exemplary embodiment of the present invention. Hereinafter, the apparatus for encoding based on an intra prediction according to the current exemplary embodiment is applied to an image encoding apparatus according to the H.264 standard. However, one of ordinary skill in the art can easily understand that the apparatus for encoding based on an intra prediction according to the current exemplary embodiment can be applied to an image encoding apparatus using other intra prediction modes.

Referring to FIG. 4, the image encoding apparatus 400 includes a motion estimator 410, a motion compensator 420, an encoder 430, an intra predictor 440, a frame memory 450, a filter 460, and a restorer 470. Here, the intra predictor 440 and the encoder 430 correspond to the apparatus for encoding based on an intra prediction according to the current exemplary embodiment.

The motion estimator 410 and the motion compensator 420 perform an inter prediction which searches for a prediction value of a macro block of a current picture from a reference picture.

The intra predictor 440 performs an intra prediction which searches for a prediction value of a current block with respect to the current picture. As described with reference to FIGS. 1 and 2, the intra prediction is performed using pixels included in a pre-encoded area adjacent to the current block. The intra prediction is performed using all intra prediction modes and the optimum intra prediction direction is determined based on a rate-distortion (R-D) cost.

According to the H.264 standard, a current intra prediction direction is predicted from intra prediction directions of neighboring blocks adjacent to a current block as illustrated in FIGS. 3A and 3B, and when an intra prediction direction of the current block is equal to the optimum intra prediction direction determined based on the predicted intra prediction direction and the R-D cost, information about the intra prediction direction is encoded in 1 bit in the encoder 430.

However, the intra predictor 440 according to the current exemplary embodiment predicts the intra prediction direction of the current block using a reference block located at predetermined pixels in the x-axis and the y-axis with respect to the current block. An intra prediction direction of the reference block adjacent to the current block has a high possibility of being identical to the intra prediction direction of the current block. Specifically when the reference block is nearer to the current block than the neighboring blocks used to predict the intra prediction direction of the current block, the possibility increases.

Accordingly, the intra predictor 440 predicts the intra prediction direction of the current block as the intra prediction of the reference block which is located at an Nth pixel in the x-axis and an Mth pixel in the y-axis with respect to the current block.

In order to use a block nearest to the current block as the reference block, an absolute value of N may be smaller than the width of the current block and an absolute value of M may be smaller than the length of the current block. This will be described later in detail with reference to FIGS. 6 and 7.

Figure 5:
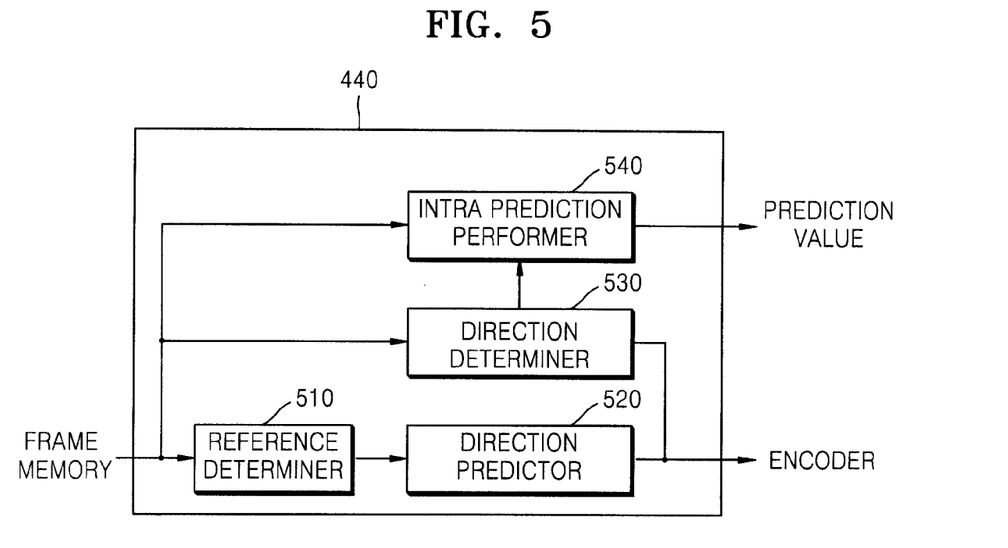
FIG. 5 illustrates an intra predictor of an apparatus for encoding based on an intra prediction according to an exemplary embodiment of the present invention.

FIG. 5 illustrates an intra predictor 440 according to an exemplary embodiment of the present invention.

Referring to FIG. 5, the intra predictor 440 according to the current exemplary embodiment includes a reference determiner 510, a direction predictor 520, a direction determiner 530, and an intra prediction performer 540.

The reference determiner 510 determines a reference block based on data about a pre-encoded area of a current picture stored in a frame memory, and determines an intra prediction direction of the reference block. Preferably, the intra prediction direction of the reference block is determined using pixels included in the pre-encoded area adjacent to the reference block. This will be described in detail with reference to FIG. 6.

Figure 6:
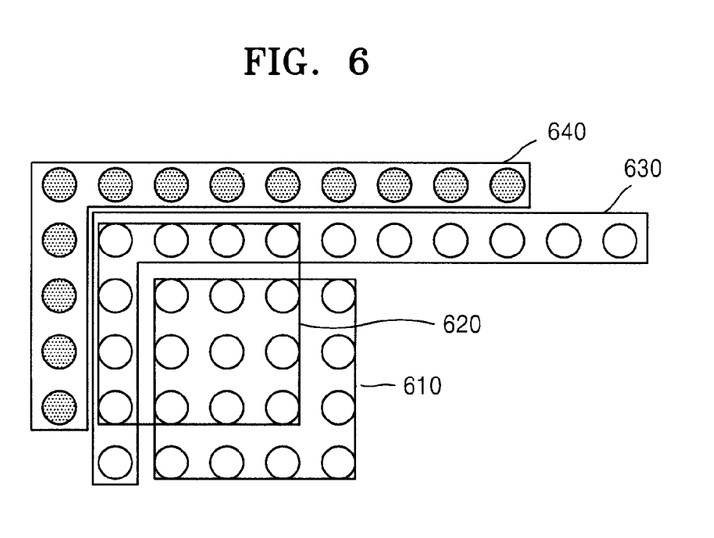
FIG. 6 illustrates a method of determining an intra prediction direction of a reference block according to an exemplary embodiment of the present invention.

FIG. 6 illustrates a method of determining an intra prediction direction of a reference block according to an exemplary embodiment of the present invention.

Referring to FIG. 6, the intra predictor 440 of FIG. 5 uses a reference block 620 while predicting an intra prediction direction of a current block 610. Here, the reference block 620 is located at a −1 pixel in the x-axis and a +1 pixel in the y-axis with respect to the current block 610. In other words, N is −1 and M is +1.

While determining the intra prediction direction of the reference block 620, the intra predictor 440 uses pixels 640 included in a pre-encoded area adjacent to the reference block 620. The intra prediction direction of the reference block 620 is determined by comparing the pixels 640 adjacent to the reference block 620 and pixels included in a pre-encoded area inside the reference block 620. Preferably, the intra prediction direction of the reference block 620 can be determined by comparing pixels 630 included in a pre-encoded area adjacent to the current block 610 and the pixels 640 adjacent to the reference block 620.

In FIG. 6, pixels of the current block 610 are partially included in the reference block 620, and thus the intra prediction direction of the reference block 620 cannot be determined using the pixels included in the reference block 620. Accordingly, the intra prediction direction of the reference block 620 is determined using pixels adjacent to the current block 610 included in the reference block 620 and the pixels 640 adjacent to the reference block 620.

The method of determining the intra prediction direction of the reference block 620 illustrated in FIG. 6 is only an example and one of ordinary skill in the art can easily understand that the intra prediction direction of the reference block 620 can be determined using other methods.

Referring back to FIG. 5, the direction predictor 520 predicts the intra prediction direction of the current block 610 based on the intra prediction direction of the reference block 620 determined in the reference determiner 510. Preferably, the intra prediction direction of the reference block 620 may be predicted as the intra prediction direction of the current block 610. This will be described in detail with reference to FIG. 7.

Figure 7:
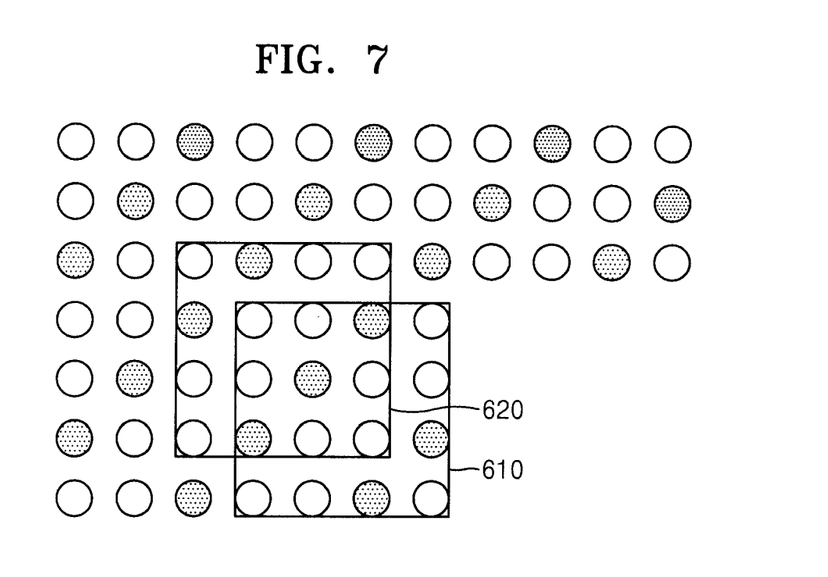
FIG. 7 illustrates a method of predicting an intra prediction direction of a current block according to an exemplary embodiment of the present invention.

FIG. 7 illustrates a method of predicting an intra prediction direction of a current block 610 according to an exemplary embodiment of the present invention.

Referring to FIG. 7, a reference block 620 located at a −1 pixel in the x-axis and a +1 pixel in the y-axis with respect to a current block 610 has a possibility of having the highest correlation with the current block 610. As illustrated in FIG. 7, black pixels are arranged from the upper right to the lower left in a diagonal direction.

Accordingly when the intra prediction direction of the reference block 620 is determined to be a diagonal direction using the method illustrated in FIG. 6, the diagonal direction is predicted as the intra prediction direction of the current block 610. Since the optimum intra prediction direction of the current block 610 is also a diagonal direction, the optimum intra prediction direction is equal to an intra prediction direction predicted using the reference block 620, and thus information about the intra prediction direction is compressed.

When the intra prediction direction of the current block 610 is predicted using the exemplary embodiment illustrated in FIG. 6, the intra prediction direction of the current block 610 can be more accurately predicted than a related art technology, and thus the compression rate of encoding is improved.

Referring back to FIG. 5, the direction determiner 530 determines the intra prediction direction of the current block using the pixels 630 of FIG. 6 adjacent to the current block stored in the frame memory 450. The intra prediction is performed on the current block using various intra prediction modes according to the related art technology as illustrated in FIGS. 1 and 2 and the optimum intra prediction direction is determined by calculating the R-D cost of each mode.

The intra prediction performer 540 generates a prediction value of the current block according to the intra prediction direction determined in the direction determiner 530. The generated prediction value is subtracted from the actual value of the current block in order to generate a residue Dn, and the generated residue Dn is encoded in the encoder 530.

Referring back to FIG. 4, the encoder 430 intra prediction encodes the current block based on the predicted intra prediction direction of the current block generated in the intra predictor 530 and the determined intra prediction direction of the current block. The current block is encoded using the intra prediction direction predicted in the direction predictor 520 based on the intra prediction direction of the reference block 620 and the intra prediction direction of the current block determined by the direction determiner 530.

When the predicted intra prediction direction and the determined intra prediction direction are equal, information about the intra prediction direction is encoded using 1 bit as illustrated in FIG. 3B. Since the method of predicting an intra prediction direction according to the current exemplary embodiment is more accurate than a related art method, the possibility of the predicted intra prediction direction and the determined intra prediction direction being equal increases, and thus the compression rate of encoding improves.

A residue, which is a difference between the prediction value of the current block generated in the intra predictor 410 and the actual value of the current block, is converted to a frequency domain and then quantized. When the quantized residue is encoded, information about an encoded intra prediction direction is inserted into an overhead in order to generate a bit stream including data about the current block.

Figure 8:
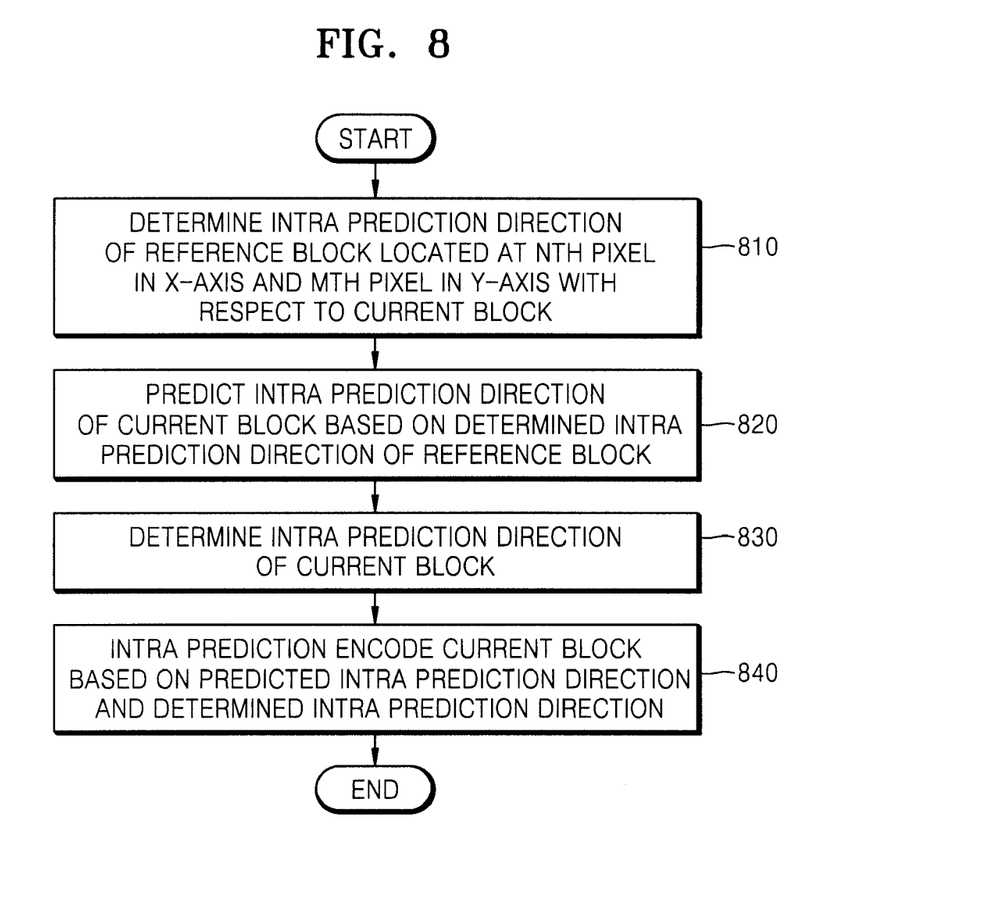
FIG. 8 is a flowchart illustrating a method of encoding based on an intra prediction according to an exemplary embodiment of the present invention.

FIG. 8 is a flowchart illustrating a method of encoding based on an intra prediction according to an exemplary embodiment of the present invention.

Referring to FIG. 8, in operation 810, an apparatus for encoding based on an intra prediction according to an exemplary embodiment of the present invention determines an intra prediction direction of a reference block located at an Nth pixel in the x-axis and an Mth pixel in the y-axis with respect to a current block.

In order to use a block nearest to the current block as the reference block, N may be a value whose absolute value is smaller than the width of the current block and M may be a value whose absolute value is smaller than the length of the current block. In FIGS. 6 and 7, N is −1 and M is +1.

The intra prediction direction of the reference block is determined using pixels included in a pre-encoded area adjacent to the reference block.

In operation 820, the apparatus predicts the intra prediction direction of the current block based on the intra prediction direction of the reference block determined in operation 810.

In operation 830, the apparatus determines the intra prediction direction of the current block. The determination of the intra prediction is performed using various intra prediction modes as illustrated in FIGS. 1 and 2, as the related art technology, and the optimum intra prediction direction is determined by calculating the R-D cost.

In operation 840, the apparatus intra prediction encodes the current block based on the intra prediction direction of the current block predicted in operation 810 and the intra prediction direction of the current block determined in operation 830.

Based on whether the predicted intra prediction direction and the determined intra prediction direction are equal, information about the intra prediction direction is encoded as illustrated in FIG. 3B. A bit stream including data about the current block is generated by encoding the residue, which is a difference between the predicted value and the actual value of the current block, and the information about the intra prediction direction.

Figure 9:
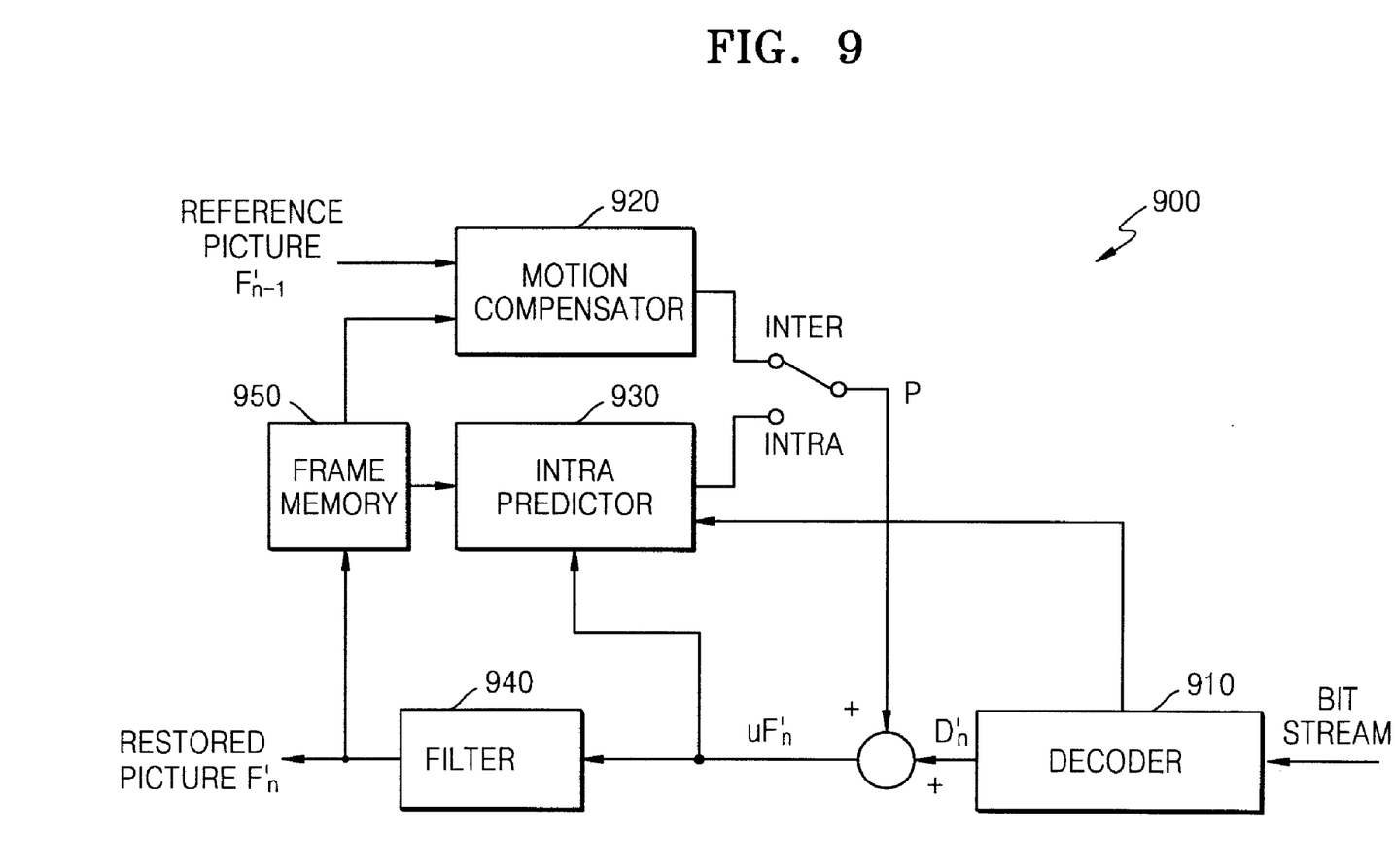
FIG. 9 illustrates an image decoding apparatus employing an apparatus for decoding based on an intra prediction according to an exemplary embodiment of the present invention.

FIG. 9 illustrates an image decoding apparatus 900 employing an apparatus for decoding based on an intra prediction according to an exemplary embodiment of the present invention.

Referring to FIG. 9, the image decoding apparatus 900 includes a decoder 910, a motion compensator 920, an intra predictor 930, a filter 940, and a frame memory 950. The decoder 910 and the intra predictor 930 correspond to the apparatus for decoding based on an intra prediction according to the current exemplary embodiment.

The motion compensator 920 performs motion compensation by referring to a reference picture. A prediction value generated after the motion compensation is used as a prediction value of a current block.

The decoder 910 receives a bit stream including data about the current block that is intra prediction encoded based on a predicted intra prediction direction that is based on an intra prediction direction of a reference block located at an Nth pixel in the x-axis and an Mth pixel in the y-axis with respect to the current block, determines the intra prediction direction of the current block, and a determined intra prediction direction, and extracts data about residue of the current block and data about the intra prediction direction from the received bit stream.

A quantized coefficient is generated from the extracted data about the residue and the residue of the current block is restored by performing an inverse quantization and an inverse conversion.

When the intra prediction direction predicted from the reference block and the actual intra prediction direction of the current block are equal, data of a length of 1 bit is extracted as the information about the intra prediction direction. However, when they are not equal, data of a length of 4 bits are extracted as the data about the actual intra prediction direction.

The intra predictor 930 intra predicts the intra prediction direction of the current block based on the information about the intra prediction direction extracted from the decoder 910. The prediction value of the current block is generated using a pre-decoded area of the current picture stored in the frame memory 950.

Figure 10:
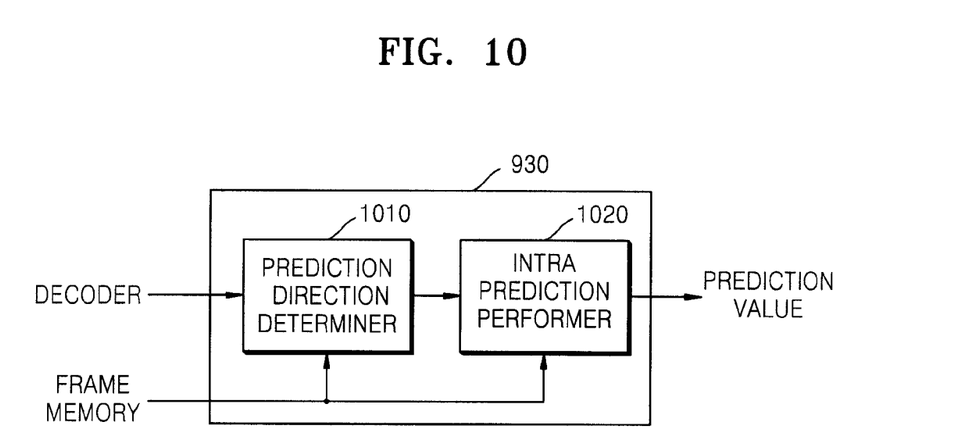
FIG. 10 illustrates an intra predictor of an apparatus for decoding based on an intra prediction according to an exemplary embodiment of the present invention.

FIG. 10 illustrates an intra predictor 930 of an apparatus for decoding based on an intra prediction according to an exemplary embodiment of the present invention.

Referring to FIG. 10, the intra predictor 930 according to the current exemplary embodiment includes a prediction direction determiner 1010 and an intra prediction performer 1020.

The prediction direction determiner 1010 determines an intra prediction direction of a current block based on data about an intra prediction direction extracted from a decoder.

When data of a length of 4 bits is extracted as the data about the actual intra prediction direction since the intra prediction direction predicted from a reference block and the actual intra prediction direction of the current block are not identical, the intra prediction direction included in the extracted data is determined to be the intra prediction direction of the current block.

However, when the predicted intra prediction direction and the actual intra prediction direction of the current block are identical and thus data of a length of 1 bit is extracted as the data about the intra prediction direction, the intra prediction direction is determined using the same method as the method of encoding based on an intra prediction according to the current exemplary embodiment of the present invention.

A reference block used for predicting the intra prediction direction of the current block is determined similar to the method of encoding based on an intra prediction. When N is −1 and M is +1, the reference block may be the reference block 620 illustrated in FIG. 6.

When the reference block is determined, the intra prediction direction of the current block is predicted using pixels included in a pre-decoded area of a current picture stored in the frame memory 950. In other words, the intra prediction direction of the current block is predicted using pixels included in a pre-decoded area adjacent to the reference block. Since the predicted intra prediction direction is equal to the intra prediction direction of the current block, the predicted intra prediction direction becomes the intra prediction direction of the current block.

The intra prediction performer 1020 generates a prediction value of the current block by performing an intra prediction on the current block based on the intra prediction direction determined by the prediction direction determiner 1010.

The prediction value generated as a result of the intra prediction is added to the residue generated in the decoder 910 and is restored to the current block. The restored current block passes through the filter 940 and is stored in the frame memory 950.

Figure 11:
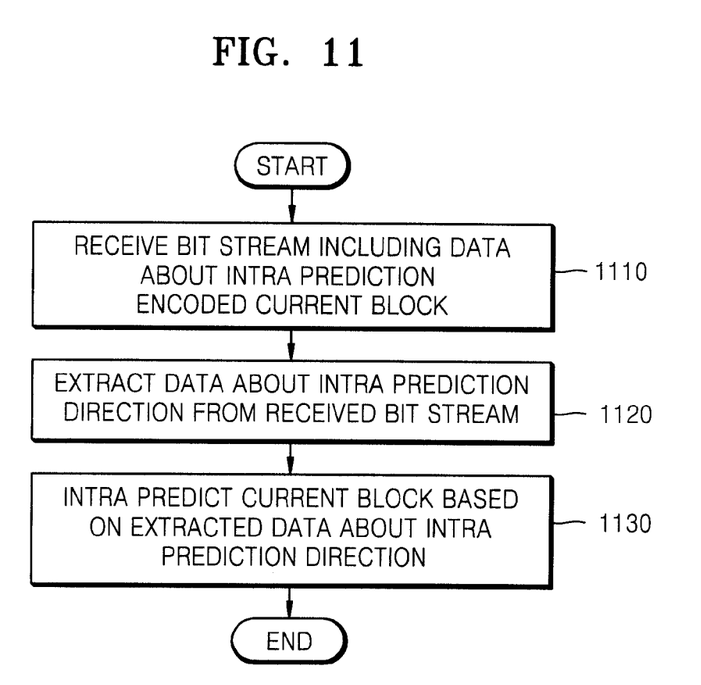
FIG. 11 is a flowchart illustrating a method of decoding based on an intra prediction according to an exemplary embodiment of the present invention.

FIG. 11 is a flowchart illustrating a method of decoding based on an intra prediction according to an embodiment of the present invention.

In operation 1110, an apparatus for decoding based on an intra prediction according to an exemplary embodiment of the present invention receives a bit stream including data about a current block intra prediction encoded using the method of encoding based on an intra prediction described above.

An intra prediction direction of the current block is predicted based on an intra prediction direction of a reference block located at an Nth pixel in the x-axis and an Mth pixel in the y-axis with respect to the current block, the intra prediction direction of the current block is determined, and a bit stream intra prediction encoded based on the predicted intra prediction direction and the determined intra prediction direction is received.

In operation 1120, the apparatus extracts data about the intra prediction direction from the received bit stream.

Data about residue of the current block and data about the intra prediction direction are extracted.

In operation 1130, the apparatus intra predicts the current block based on the extracted data about the intra prediction direction. A prediction value generated as a result of the intra prediction is added to the data about the residue of the current block extracted in operation 1120 and thus the current block is restored.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

According to the exemplary embodiments of the present invention, the intra prediction direction of the current block can be accurately predicted while performing an intra prediction encoding, and thus the possibility of compressing information about the intra prediction direction is increased. Accordingly, the compression rate of encoding image data is improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of encoding an image based on an intra prediction, the method comprising:

determining an intra prediction direction of a reference block located at an Nth pixel in an x-axis and an Mth pixel in a y-axis with respect to a current block;

predicting a first intra prediction direction of the current block based on the determined intra prediction direction of the reference block;

determining a second intra prediction direction of the current block; and intra prediction encoding the current block based on the first predicted intra prediction direction of the current block and the determined second intra prediction direction of the current block, wherein N is smaller than a width of the current block, and M is smaller than a length of the current block.

2. The method of claim 1, wherein the determining of the intra prediction direction of the reference block comprises comparing pixels included in a pre-encoded area adjacent to the reference block and pixels included in a pre-encoded area inside the reference block.

3. The method of claim 1, wherein N is a negative integer whose absolute value is smaller than a width of the current block, and M is a positive integer whose absolute value is smaller than a length of the current block.

4. The method of claim 3, wherein N is −1 and M is +1.

5. An apparatus for encoding an image based on an intra prediction, the apparatus comprising:
    an intra predictor which predicts a first intra prediction direction of a current block based on an intra prediction direction of a reference block located at an Nth pixel in an x-axis and an Mth pixel in a y-axis with respect to the current block, and determines a second intra prediction direction of the current block;
    an encoder which intra prediction encodes the current block based on the predicted first intra prediction direction of the current block and the determined second intra prediction direction of the current block,
    wherein N is smaller than a width of the current block, and M is smaller than a length of the current block.

6. The apparatus of claim 5, wherein the intra predictor comprises:
    a reference determiner which determines the intra prediction direction of the reference block using pixels included in a pre-encoded area adjacent to the reference block; and
    a direction predictor which predicts the intra prediction direction of the current block based on the determined intra prediction direction of the reference block.

7. The apparatus of claim 5, wherein N is a negative integer whose absolute value is smaller than a width of the current block, and M is a positive integer whose absolute value is smaller than a length of the current block.

8. The apparatus of claim 7, wherein N is −1 and M is +1.

9. A method of decoding an image based on an intra prediction, the method comprising:
    receiving a bit stream comprising data related to a current block that is intra prediction encoded based on a predicted intra prediction direction of the current block that is predicted based on an intra prediction direction of a reference block located at an Nth pixel in an x-axis and an Mth pixel in a y-axis with respect to the current block, and a determined intra prediction direction of the current block;
    extracting data about the determined intra prediction direction of the current block from the received bit stream; and
    intra predicting the current block based on the extracted data about the determined intra prediction direction of the current block,
    wherein N is smaller than a width of the current block, and M is smaller than a length of the current block.

10. The method of claim 9, wherein N is a negative integer whose absolute value is smaller than a width of the current block, and M is a positive integer whose absolute value is smaller than a length of the current block.

11. The method of claim 10, wherein N is −1 and M is +1.

12. An apparatus for decoding an image based on intra prediction, the apparatus comprising:
    a decoder which receives a bit stream including data related to a current block that is intra prediction encoded based on a predicted intra prediction direction of the current block that is predicted based on an intra prediction direction of a reference block located at an Nth pixel in an x-axis and an Mth pixel in a y-axis with respect to the current block, and a determined intra prediction direction of the current block, and extracts data about the determined intra prediction direction of the current block from the received bit stream; and
    an intra predictor which intra predicts the current block based on the extracted data about the determined intra prediction direction of the current block,
    wherein N is smaller than a width of the current block, and M is smaller than a length of the current block.

13. The apparatus of claim 12, wherein N is a negative integer whose absolute value is smaller than a width of the current block, and M is a positive integer whose absolute value is smaller than a length of the current block.

14. The apparatus of claim 13, wherein N is −1 and M is +1.

15. A non-transitory computer readable recording medium having recorded thereon a computer program for executing a method of encoding an image based on an intra prediction, the method comprising:
    determining an intra prediction direction of a reference block located at an Nth pixel in an x-axis and an Mth pixel in a y-axis with respect to a current block;
    predicting a first intra prediction direction of the current block based on the determined intra prediction direction of the reference block;
    determining a second intra prediction direction of the current block; and
    intra prediction encoding the current block based on the predicted first intra prediction direction of the current block and the determined second intra prediction direction of the current block,
    wherein N is smaller than a width of the current block, and M is smaller than a length of the current block.

* * * * *